(12) United States Patent
Jazra et al.

(10) Patent No.: US 8,942,104 B2
(45) Date of Patent: Jan. 27, 2015

(54) PACKET CLASSIFICATION AND PRIORITIZATION USING A UDP CHECKSUM IN A MOBILE WIRELESS DEVICE

(75) Inventors: Cherif Jazra, San Francisco, CA (US); Sundararaman V. Shiva, Los Gatos, CA (US); Thanigaivelu Elangovan, Santa Clara, CA (US); Tong Liu, San Diego, CA (US); Madhusudan Chaudhary, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 12/870,534

(22) Filed: Aug. 27, 2010

(65) Prior Publication Data

US 2012/0033590 A1 Feb. 9, 2012

Related U.S. Application Data

(60) Provisional application No. 61/371,131, filed on Aug. 5, 2010.

(51) Int. Cl.
| | |
|---|---|
| *H04J 3/14* | (2006.01) |
| *H04L 12/801* | (2013.01) |
| *H04L 12/46* | (2006.01) |
| *H04L 12/851* | (2013.01) |
| *H04L 12/863* | (2013.01) |

(52) U.S. Cl.
CPC ............ *H04L 47/14* (2013.01); *H04L 12/4633* (2013.01); *H04L 47/2408* (2013.01); *H04L 47/2441* (2013.01); *H04L 47/6295* (2013.01)
USPC ............................ 370/237; 370/252; 370/310

(58) Field of Classification Search
USPC .......................................... 370/252, 310, 338
See application file for complete search history.

(56) References Cited

U.S. PATENT DOCUMENTS

| 6,650,644 B1 | 11/2003 | Colley et al. |
| 7,106,737 B1 | 9/2006 | Beyda et al. |
| 7,167,447 B2 | 1/2007 | Puuskari et al. |

(Continued)

FOREIGN PATENT DOCUMENTS

WO 2007/055933 5/2007

OTHER PUBLICATIONS

U.S. Appl. No. 12/870,667, filed Aug. 27, 2010.

(Continued)

*Primary Examiner* — Donald Mills
*Assistant Examiner* — Henry Baron
(74) *Attorney, Agent, or Firm* — Park, Vaughan, Fleming & Dowler LLP

(57) ABSTRACT

A method and apparatus for packet classification and prioritization using a user datagram protocol (UDP) header in a mobile wireless device. The mobile wireless device includes an application processor and a transceiver. The application processor sets a value of a field embedded in a higher layer packet and transfers the higher layer packet to the transceiver. The transceiver receives the higher layer packet from the application processor and reads the set value of the embedded field. The transceiver clears the value in the embedded field and creates at least one lower layer protocol data unit from the higher layer packet. The transceiver maps the lower layer protocol data unit to a wireless access channel having a transmission property based on the read value of the embedded field. In representative embodiments, the embedded field is an optional checksum in a UDP header.

16 Claims, 12 Drawing Sheets

(56) References Cited

U.S. PATENT DOCUMENTS

| | | |
|---|---|---|
| 7,337,384 B2 | 2/2008 | Lakaniemi |
| 7,408,940 B2 | 8/2008 | Jin et al. |
| 7,760,739 B2 | 7/2010 | Jung et al. |
| 8,139,551 B2 * | 3/2012 | Katsube et al. ............... 370/338 |
| 2002/0019236 A1 | 2/2002 | Thompson et al. |
| 2003/0185210 A1 | 10/2003 | McCormack |
| 2004/0039833 A1 | 2/2004 | Ludwig et al. |
| 2004/0125797 A1 * | 7/2004 | Raisanen ..................... 370/389 |
| 2005/0237960 A1 | 10/2005 | Kim |
| 2008/0002592 A1 | 1/2008 | Yegani et al. |
| 2009/0258634 A1 * | 10/2009 | Amine ......................... 455/413 |

OTHER PUBLICATIONS

Cisco Systems White Paper, "Diffserv—The Scalable End-To-End Quality of Service Model," Aug. 2005, pp. 1-19.

Baghaei et al., "Review of quality of service performance in wireless LANs and 3G multimedia application services," www.sciencedirect.com, pp. 1684 & 1685, May 25. 2004.

Jussi Laukkanen, "UMTS Quality of Service Concept and Architecture," Department of Computer Science, University of Helsinki, May 4, 2000, pp. 1-7.

* cited by examiner

PACKET CLASSIFICATION AND PRIORITIZATION USING A UDP CHECKSUM IN A MOBILE WIRELESS DEVICE

CROSS-REFERENCE TO RELATED APPLICATIONS

This patent application takes priority under 35 U.S.C. 119 (e) to U.S. Provisional Patent Application Ser. No. 61/371, 131 entitled, "PACKET CLASSIFICATION AND PRIORITIZATION USING A UDP CHECKSUM IN A WIRELESS DEVICE" by Jazra et al. filed Aug. 5, 2010 which is incorporated by reference herein in its entirety for all purposes.

CROSS-REFERENCE TO RELATED APPLICATIONS

This application is related to U.S. patent application Ser. No. 12/870,667, filed concurrently herewith, by Jazra et al. entitled "PACKET CLASSIFICATION AND PRIORITIZATION USING AN IP HEADER IN A MOBILE WIRELESS DEVICE", which is incorporated by reference herein in its entirety for all purposes.

TECHNICAL FIELD

The described embodiments relate generally to wireless mobile communications. More particularly, a method and apparatus is described for packet classification and prioritization using a User Datagram Protocol (UDP) checksum in a wireless device.

BACKGROUND OF THE INVENTION

Mobile wireless communication devices, such as a cellular telephone or a wireless personal digital assistant, can provide a wide variety of communication services including, for example, voice communication, text messaging, internet browsing, and electronic mail. Each of these applications can have different service requirements for operating characteristics, such as performance parameters for delay latency, packet loss and jitter tolerance. Providing the capability to ensure an end to end quality of service (QoS) characteristic for an application can prove challenging, as packets can traverse multiple independent nodes between the mobile wireless communication device and a destination end point. Setting QoS characteristics within an IP network can be accomplished by managing link bandwidths to achieve an acceptable packet loss rate. Increasing transmission capacity between nodes can lower the packet loss rate; however, on a wireless access network, with limited radio frequency bandwidth shared by multiple users, implementing QoS can require prioritizing packets into different flows, each flow having different transmission characteristics. Matching higher layer application level QoS requirements to lower layer transmission level flows can ensure packets receive appropriate treatment when traversing the wireless access network.

IP networks were originally designed for best effort delivery of data that could tolerate indeterminate delay and packet loss. More recently, QoS models for IP networks have been developed including a differentiated services model that can provide QoS for connections through an IP network. A User Datagram Protocol (UDP) checksum field can be included in a UDP header attached to UDP data and encapsulated in an IP datagram at a source endpoint. Additionally, the IP datagram can include an IP header. Routers along a connection path can read the IP header to determine how to handle the IP packet to provide a QoS as specified in the IP header. The IP header can provide a convenient "in band" method of signaling for processing units, such as routers, that operate using higher layer protocols.

Processing units that operate using lower layer protocols can treat the IP header as data only. Not all equipment through which the IP packet passes can read the IP header, and thus alternative methods of providing differentiated treatment for the IP packet by network components operating at the link layer can use "out of band" signaling methods. In particular, wireless transceivers included in mobile wireless communication devices can treat the entire IP packet, including the IP header, as a data payload without reading any of its contents. Separate mechanisms can be required by the wireless transceiver to ensure IP packets received from a source application are accorded appropriate QoS treatment by the wireless transceiver at the link layer. These separate mechanisms can prove cumbersome. The UDP checksum field contained in the UDP header can be considered optional and unused by higher layer protocols. The UDP checksum field can thus be available to use for communication between processing units within the mobile wireless device. The UDP checksum field can be used separately from or in conjunction with the IP header to provide in-band signaling methods that can be more efficient than out of band signaling methods.

Thus there exists a need to classify and prioritize packets at both the network and link layers automatically by the mobile wireless communication device using the UDP checksum field.

SUMMARY OF THE DESCRIBED EMBODIMENTS

The described embodiments relate generally to wireless mobile communications. More particularly, a method and apparatus is described for packet classification and prioritization using a user datagram protocol (UDP) header in a mobile wireless communication device.

In one embodiment, a method for packet classification in a mobile wireless device includes at least the following steps. An application processor in the mobile wireless device sets a value in a field of a higher layer packet. The application processor transfers the higher layer packet to a transceiver. The transceiver reads the value of the field embedded in the higher layer packet. The transceiver creates a lower layer protocol data unit from the higher layer packet. The transceiver maps the lower layer protocol data unit to a wireless access channel having a transmission property based on the read value of the field. In some embodiments, the transceiver clears the value in the field of the higher layer packet set by the application processor. In some embodiments, the field is an optional checksum of a user datagram protocol header.

In another embodiment, a wireless apparatus includes at least the following elements. The wireless apparatus includes an application processor configured for generating a higher layer packet, setting a value of a header field in the higher layer packet, and transferring the higher layer packet to a transceiver. The wireless apparatus also includes the transceiver configured to receive the higher layer packet from the application processor. The transceiver is configured to read the value of the header field set by the application processor in the higher layer packet and to clear the value of the header field in the higher layer packet. The transceiver is configured to create at least one lower layer protocol data unit from the higher layer packet. The transceiver is configured to map the lower layer protocol data unit to a wireless channel having a transmission property based on the header field value read by the transceiver. In some embodiments, the higher layer packet is a user datagram protocol packet, and the header field is an optional checksum embedded in a header of the user datagram protocol packet.

In yet another embodiment, a computer program product encoded in a computer readable medium for packet classification in a mobile device includes at least the following elements. In the mobile device, non-transitory computer program code forms a packet containing a segment specifying a quality of service property for the packet. The computer program product also includes non-transitory computer program code for reading a value of the segment contained in the packet. The computer program product also includes non-transitory computer program code for creating at least one protocol data unit from the packet. The computer program product further includes non-transitory computer program code for establishing a wireless access channel based on the value of the segment and mapping the lower layer protocol data unit to the established wireless channel. In some embodiments, establishing the wireless access channel includes setting a prioritization property for transmission through the wireless access channel.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
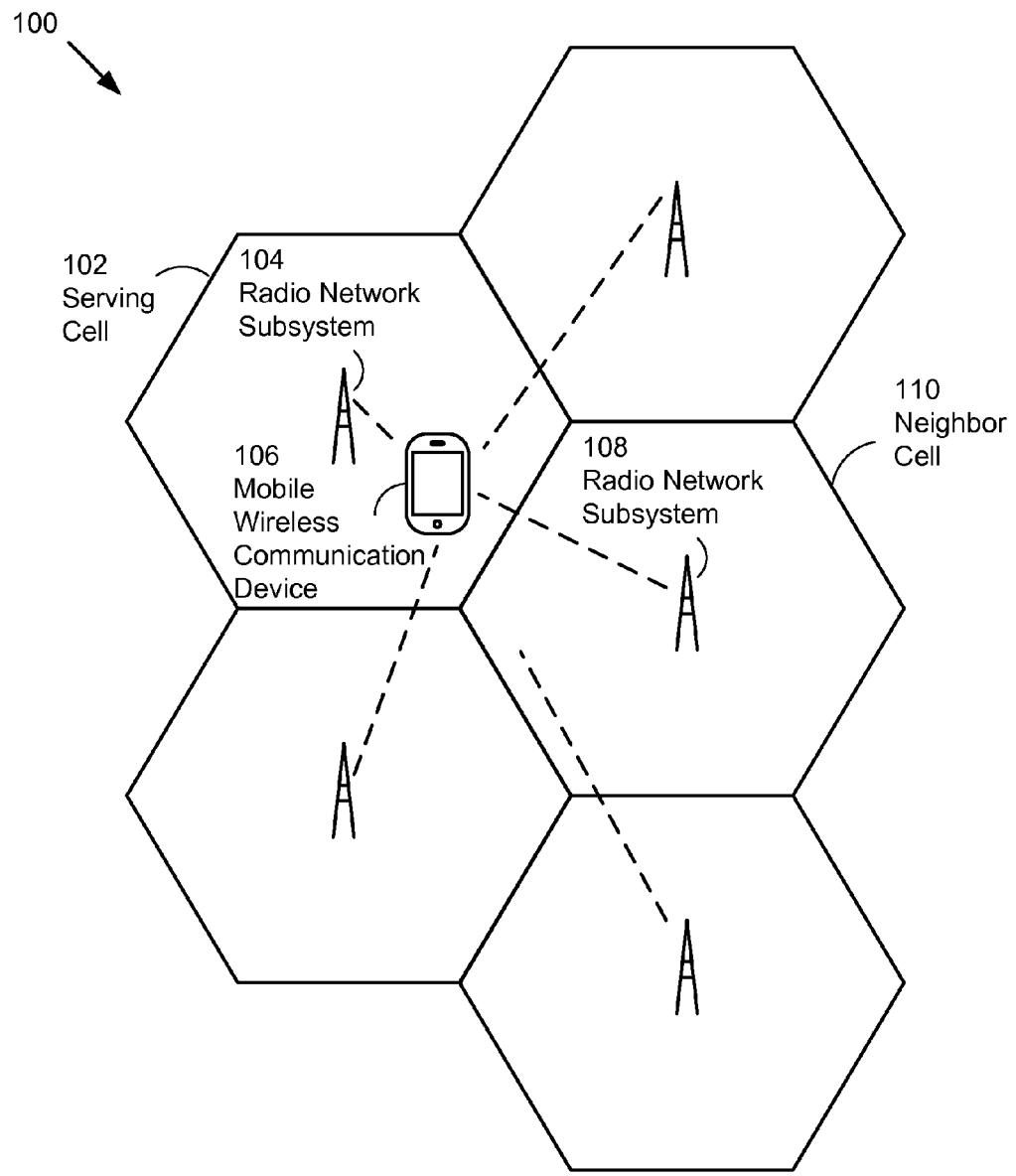
FIG. 1 illustrates a mobile wireless communication device located within a wireless cellular communication network.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The growth of high speed communication links has enabled a common infrastructure, such as the internet, to carry a diverse array of applications including voice, audio, video, gaming, data transfer, and many others simultaneously. Different applications that access different services across a communication link can require different quality of service (QoS) properties to operate properly. Packets generated by each application can be treated differently rather than identically when transported through the communication link. Different applications can require that packets have different amounts of delay, jitter, loss rates and throughput. Some applications can be more sensitive to time delays, such as conversational voice and interactive gaming. Other applications can require guaranteed arrival of the packets with no packet loss for a highly reliable connection such as when securely downloading data files.

While the internet was originally designed to provide a best-effort service, increasingly applications require more stringent properties for packet transfer and delivery. The access portion of communication networks, particularly wireless radio access links, can share a limited bandwidth of available resources among many users simultaneously, and each user can use multiple applications. Matching required QoS treatment for internet packets, also known as internet protocol (IP) datagrams, originally designed for transport through higher layer processing nodes, such as routers within a communication network, to a limited bandwidth radio access link can prove challenging. In a typical implementation, QoS at a higher layer, such as used by IP routers at an internet layer can be defined and maintained separately from QoS at a lower layer, such as used by wireless transceivers and access network systems at a link layer. Both QoS at the internet layer and QoS at the link layer can serve to satisfy an application's requirements, but two different QoS mechanisms can be used in parallel. Providing a link between the QoS mechanisms can simplify and improve designs for mobile wireless devices.

While wireless access networks were originally designed to service voice applications and therefore offered limited QoS options, the addition of packet based data services has spurred the inclusion of mechanisms to request an array of QoS properties for a connection. When a communication link is established, such as when setting up a packet data protocol (PDP) context, a request can be made for particular properties for the communication link from the wireless network. These properties can include QoS settings that can influence how a data packet is treated over portions of the communication link at the link layer. A mobile communication device can be connected to an access portion of a wireless network through multiple communication links simultaneously, and each communication link can have different QoS properties associated with it. At the same time, multiple applications can operate simultaneously in the mobile communication device, and each application can generate packets that can require different QoS treatment. An application can require a particular QoS treatment for a data packet at a network layer (or equivalently at an internet protocol or routing/transport layer) in a communication link, using an in-band "type of service" (TOS) header that indicates certain properties for the data packet. Communication between the application and the network layer can occur through a standard "socket" interface. In typical prior art implementations, the lower link layer can ignore the IP TOS header, and the application can request particular QoS properties using non-standard proprietary interfaces separately from setting the IP TOS header field values. Rather than using two separate mechanisms by which an application can indicate QoS properties for a packet, a common mechanism can be preferred.

In a basic QoS implementation, all data packets from an application can be associated with an established communication link having one or more appropriately matching QoS properties. To indicate a mapping between an application's data packets and a communication link, a proprietary out of band signaling method for configuring QoS properties can be used between an application processor that generates the data packets and a wireless transceiver that transmits the data packets. The application, for example, can request a communication link with particular QoS properties from the wireless transceiver, and the wireless transceiver can indicate back to the application what QoS properties are available for one or more established communication links. The application can choose to allocate packets to particular communication links based on the QoS properties indicated by the wireless transceiver. Individual queues for each communication link can exist into which the application can place packets for transmission. The application can thus ensure appropriate QoS treatment for each packet at the link layer by allocating a queue associated with a communication link having one or more requisite QoS properties. In more complex implementations, applications using higher layer internet protocols can embed QoS parameters in each data packet individually, so that each data packet can be treated differently by nodes in the communication network.

Typically, wireless transceivers operate using lower layer protocols and treat received packets from higher layers purely as data for transport. The wireless transceiver can thus ignore QoS parameters embedded by higher layer protocols. To provide differentiated treatment to the individual data packets by a wireless transceiver processing unit in the mobile communication device, a QoS tag can be appended instead to each data packet generated by an application to identify packet classifications, prioritizations or other sets of QoS properties to the wireless transceiver. Disadvantageously, the QoS tag can add overhead to communication between the application processor and the wireless transceiver that sends the data packets over a wireless access connection. Alternatively, as described above, the application can learn from the wireless transceiver QoS properties for individual communication links and place packets in queues destined for a communication link having appropriate QoS properties. This approach, however, then requires that the application implement two mechanisms in parallel, an in-band QoS signaling mechanism for the network layer components and a queue management mechanism for the link layer components. A single common mechanism that links QoS for both the network layer and the link layer can be preferred.

To eliminate the necessity for a separate mechanism by which the application can set QoS properties for packets, such as by using out of band QoS signaling and the QoS tag overhead attached to data packets communicated between the application processor and the wireless transceiver, an in band QoS signaling method can be used instead. The in-band QoS signaling method can reuse QoS parameters already embedded by higher layer protocols or can create new QoS meanings for fields already present and unused for other purposes. A data packet output by the application processor can include headers for network layer and transport layer protocols used to format the data packet. Certain fields in the headers can be used to specify QoS properties for the data packet without affecting the field's common use for internet protocol functionality. The higher layer protocol fields can be read by lower layer protocol processing elements in the wireless transceiver and used to configure parameters that can affect the QoS properties for the data packet (or more precisely for lower layer protocol data units (PDUs) derived from the higher layer data packet). The lower layer protocols can establish and maintain communication links having certain QoS properties based on values indicated by fields contained in the data packets. A higher layer application running in an application processor can send packets to lower layer processing elements in a wireless transceiver without needing to know about QoS properties of individual communication links maintained by the lower layers. Through a standard socket implementation, the application can indirectly affect link layer QoS properties by setting values in fields contained in packet headers, such as the IP TOS field.

Parameters for processing elements in the wireless transceiver that can affect QoS can be configured based on values communicated in the embedded higher layer protocol fields. Example parameters that can be configured include bandwidth, latency, timer values, PDU size, queue depths and re-transmission properties. These parameters can be configured using established protocols or by using custom implementations. A proprietary in-band command packet that can specify QoS configurations in a recognized format (such as a tag length value TLV format) can also be used with a marker in one of the field headers that identifies the proprietary command packet when initially configuring which QoS parameters to use between the application processor and the wireless transceiver.

FIG. 1 illustrates a wireless communication network 100 of overlapping wireless communication cells to which a mobile wireless communication device 106 can connect. The wireless communication network 100 can operate according to one or more different communication protocols such as a Global System for Communications (GSM) protocol, a Universal Mobile Telecommunications System (UMTS) protocol or a Long Term Evolution (LTE) protocol developed and maintained by the Third Generation Partnership Project (3GPP), a collaboration of several telecommunication standards organizations. Alternatively the wireless communication network 100 can operate using one of the set of Code Division Multiple Access 2000 (CDMA2000) standards developed by the 3GPP2. The discussion herein will primarily focus on UMTS but the same ideas apply to other wireless access network technologies.

Each wireless communication cell can cover a geographic area extending from a centralized radio network subsystem (RNS). Representative mobile wireless communication devices 106 can include "smart" phones and mobile computing devices with wireless connectivity. Mobile computing devices can also be used when attached with a wireless connectivity device. A wireless connection capability can be included internal to the mobile wireless communication device 106 or can be realized by appending an external wireless device to a mobile computing device, such as a modem dongle attached to a laptop computer. The mobile wireless communication device 106 can receive communication signals from a number of different cells in the wireless communication network 100, each cell located at a different distance from the mobile wireless communication device 106. The mobile wireless communication device 106 can be connected to a radio network subsystem 104 in a serving cell 102 and can be aware of neighbor cells in the wireless communication network 100, such as radio network subsystem 108 in neighbor cell 110. The radio resources that connect the mobile wireless communication device 106 to a cell can be limited and shared among multiple mobile wireless communication devices. The mobile wireless communication device 106 can support multiple parallel flows to the radio network subsystem 104 that can each provide different quality of service (QoS) characteristics. Packets originating at the mobile wireless communication device 106 from different applications can be mapped to different flows based on each application's QoS requirements.

Figure 2:
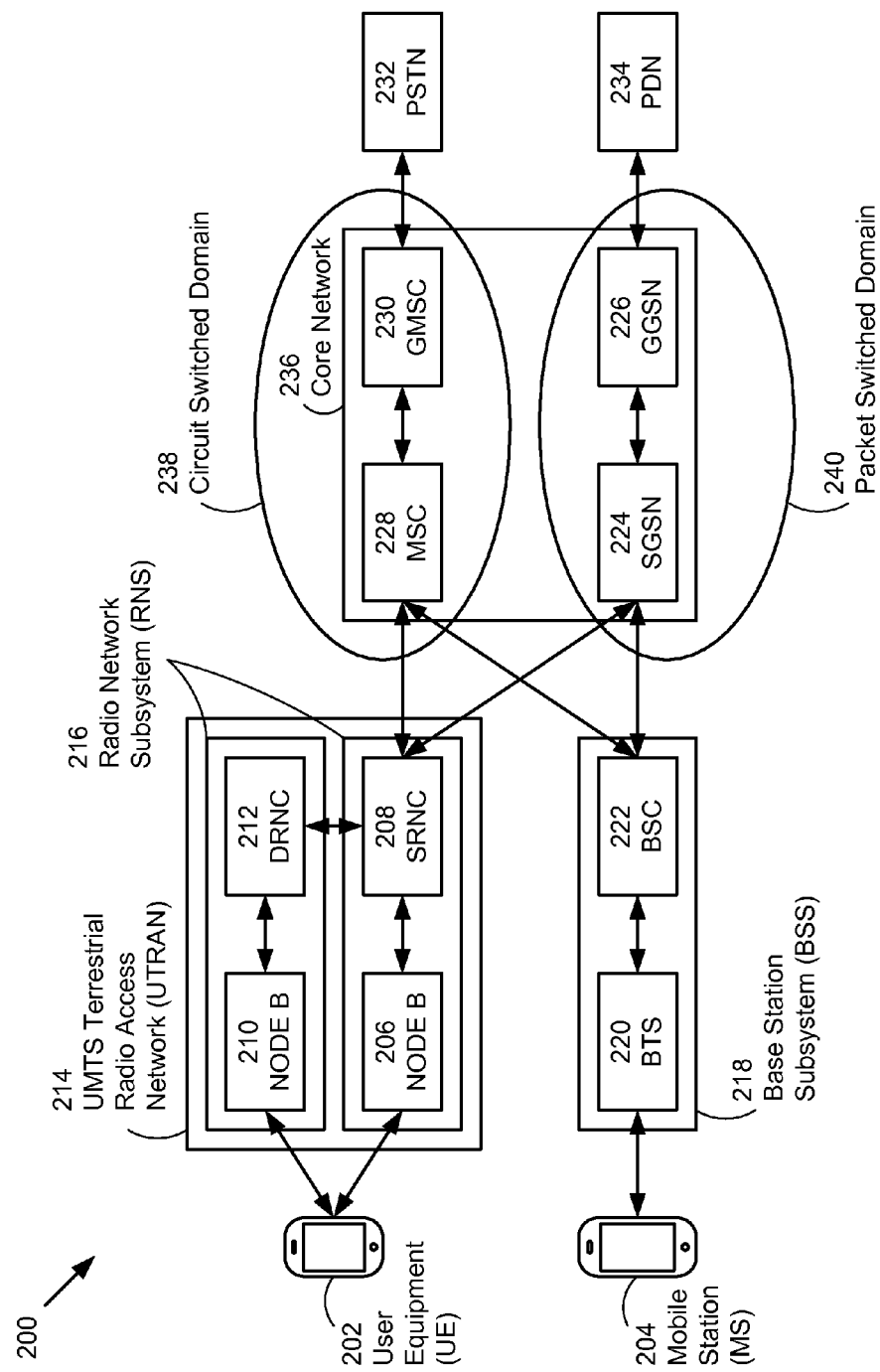
FIG. 2 illustrates a hierarchical architecture for a wireless communication network.

FIG. 2 illustrates a hybrid hierarchical architecture 200 for a wireless communication network that includes both UMTS and GSM radio access network elements. A mobile wireless communication device 106 operating in a GSM wireless communication network can be referred to as a mobile station (MS) 204, while a mobile wireless communication device 106 operating in a UMTS network can be referred to as user equipment (UE) 202. Wireless mobile communication devices 106 can include the capability of connecting to multiple wireless communication networks that use different wireless radio network technologies, such as to a GSM network and to a UMTS network; thus the description that follows can also apply to such "multi-network" devices as well as single network devices. The MS 204 can connect to the GSM wireless communication network through a radio network subsystem known as a base station subsystem (BSS) 218. The BSS 218 can include a base transceiver station (BTS) 220 that transmits and receive radio frequency signals between the MS and the wireless communication network and a base station controller (BSC) that manages the communication between a core network 236 and the MS 204. In a GSM wireless communication network, an MS 204 can be connected to one BSS at a time. As the MS 204 moves throughout the GSM wireless communication network, the BSC 222 can manage handover of the MS 204 to different BTS 220 located in different cells.

The GSM radio access network BSS 218 connects to a centralized core network 236 that can provide circuit switching and packet switching capabilities. The packet switching capability can provide a General Packet Radio Service (GPRS) that transmits internet protocol (IP) packets between the MS 204 and external data networks. A GSM network having GPRS capability can also be referred to as a 2.5G network. QoS characteristics for a data packet carrying connection between the MS 204 and the public data network 234 can be established when a packet data protocol (PDP) context is set up for the connection. The MS 204 can request particular QoS characteristics such as a packet delay or an average data rate throughput when establishing the connection. The wireless network can accept or reject the request from the MS 204.

The core network 236 can include a circuit switched domain 238 that can carry voice traffic to and from an external public switched telephone network (PSTN) and a packet switched domain 240 that can carry data traffic to and from an external public data network (PDN). The circuit switched domain 238 can include multiple mobile switching centers (MSC) 228 that connect a mobile subscriber to other mobile subscribers or to subscribers on other networks through gateway MSCs (GMSC) 230. The packet switched domain 240 can include multiple support nodes, referred to as serving GPRS support nodes (SGSN) 224, that route data traffic among mobile subscribers and to other data sources and sinks in the PDN 234 through one or more gateway GPRS support nodes (GGSN) 226. The core network 236 can be commonly used by multiple radio link access network subsystems that use different radio link technologies. As shown in FIG. 2, both a UMTS terrestrial radio access network (UTRAN) 214 and a GSM BSS 218 can connect to the same core network 236.

The circuit switched domain 238 and the packet switched domain 240 of the core network 236 can each operate in parallel, and both domains can connect to different radio access networks simultaneously. The Universal Terrestrial Radio Access Network (UTRAN) 214 in the UMTS wireless access network can include multiple radio network subsystems (RNS) 216. Each RNS 216 can include a "Node B" 206/210 that transmits and receives radio frequency signals. The RNS 216 can also include a radio network controller (RNC) 208/212 that manages communication between the "Node B" 206/210 network elements and the core network 236. Unlike the MS 204 in the GSM radio access network, the UE 202 can connect to more than one radio network subsystem (RNS) 216 simultaneously. One RNS 216 can include a "serving" radio network controller (SRNC) 208 that maintains the logical connection between the UE 202 and the core network 236 through a primary Node B 206. A second RNS 216 can include a "drift" radio network controller (DRNC) 208 that provides additional radio link resources through a secondary Node B 210 that supplements the radio link through the primary Node B 206.

A UMTS wireless communication network can use a wireless communication radio link technology known as wideband code division multiple access (W-CDMA). W-CDMA transmissions can occupy a relatively wide bandwidth based on a direct sequence spread spectrum modulation. Transmissions between a UE 202 and an RNS 216 in a UMTS network can be modulated by a spreading code, and each UE 202 connected to the RNS 216 can use a different spreading code but transmit simultaneously using the same frequency spectrum. Received signals can be demodulated by correlating them with a correctly matched de-spreading code. As the set of spreading codes used in W-CDMA can be mutually orthogonal, signals intended for a particular UE can be separated from signals transmitted to other UE, even though all of the signals can overlap and use the same frequency spectrum simultaneously. UMTS spread spectrum signals can occupy a wider 5 MHz channel bandwidth compared with a narrower 200 kHz channel bandwidth used by GSM signals.

In order for the UE 202 to communication to the RNS 216, a radio resource, such as a radio access bearer (RAB) having a particular frequency and spreading code, can be allocated by the RNS 216 in response to a service request from the UE 202. Radio resources can be allocated when requested and available and de-allocated when not used in order to share the radio frequency spectrum among multiple UEs 202. To use the GPRS capability of the wireless communication network, the UE 202 can "attach" to the network and "activate" a packet data protocol (PDP) context. By attaching to the network, the UE 202 identifies itself and the wireless communication network 100 confirms the location of the UE 202. Activating the PDP context can enable IP traffic transfer through radio resources on an "air" interface between the UE 202 and the RNS 216. The UE 202 can obtain an IP address and can establish a logical connection with a quality of service (QoS) profile through the UMTS network. A UE 202 can have multiple PDP contexts active simultaneously, and each PDP context can use a different RAB.

While FIG. 2 illustrates elements of a wireless communication network based on a GSM or UMTS technology, a similar hierarchical architecture of components can apply to other wireless access technologies, such as the established CDMA2000 standardized protocol and the emerging "Long Term Evolution" (LTE) protocols. Comparable mobile communication devices to the UE 202 and MS 204 can connect to access network systems using wireless radio access technology. Affecting QoS simultaneously at an internet protocol (IP) network layer and at a lower level radio link layer can be accomplished for these protocols similarly to those described herein for GSM and UMTS protocols.

Figure 3:
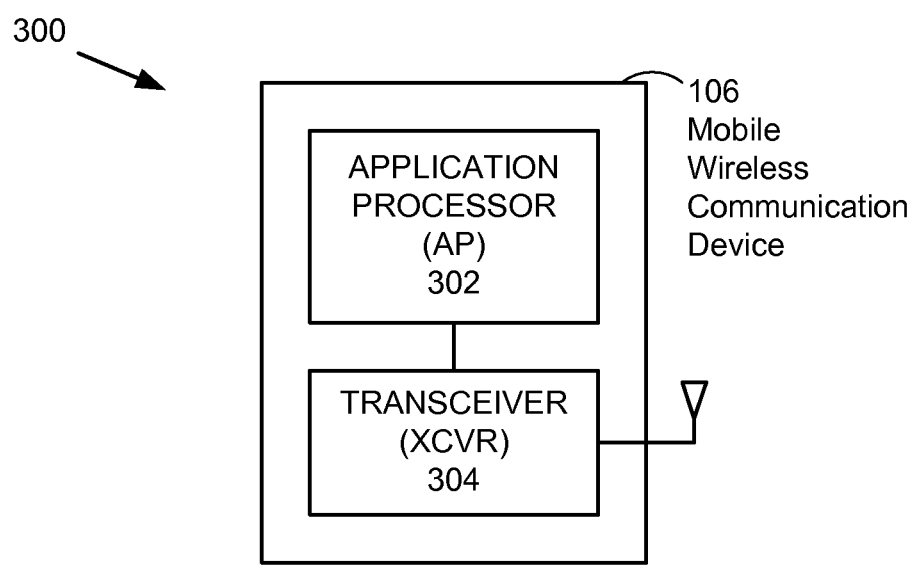
FIG. 3 illustrates components of the mobile wireless communication device.

FIG. 3 illustrates typical components of the mobile wireless communication device 106 such as the MS 204 or the UE 202. An applications processor (AP) 302 can perform higher layer functions, such as maintaining an IP stack and requesting and releasing data connections. The AP 302 can generate IP packets (also known as datagrams) and transfer them to the XCVR 304 for processing into lower layer packets, also called protocol data units (PDUs). The lower layer PDUs can be formatted appropriately for transmission over a wireless connection. The transceiver (XCVR) 304 in the mobile wireless communication device 106 can transmit and receive lower layer packets that correspond to higher layer signaling and data packets through a radio "air" interface to the RNS 216 in the wireless communication network 100. The AP 302 and XCVR 304 can be both contained within the mobile wireless communication device 106. Alternatively a XCVR 304 can be externally attached to a mobile computing device (not shown) to provide similar wireless connectivity and thereby together form a mobile wireless device. The interface between the AP 302 and the XCVR 304 can be a proprietary interface or a standardized interface. For example, the interface between the AP 302 and the XCVR 304 can use a Universal Serial Bus (USB) protocol or a serial port connection such as EIA-485.

Figure 4:
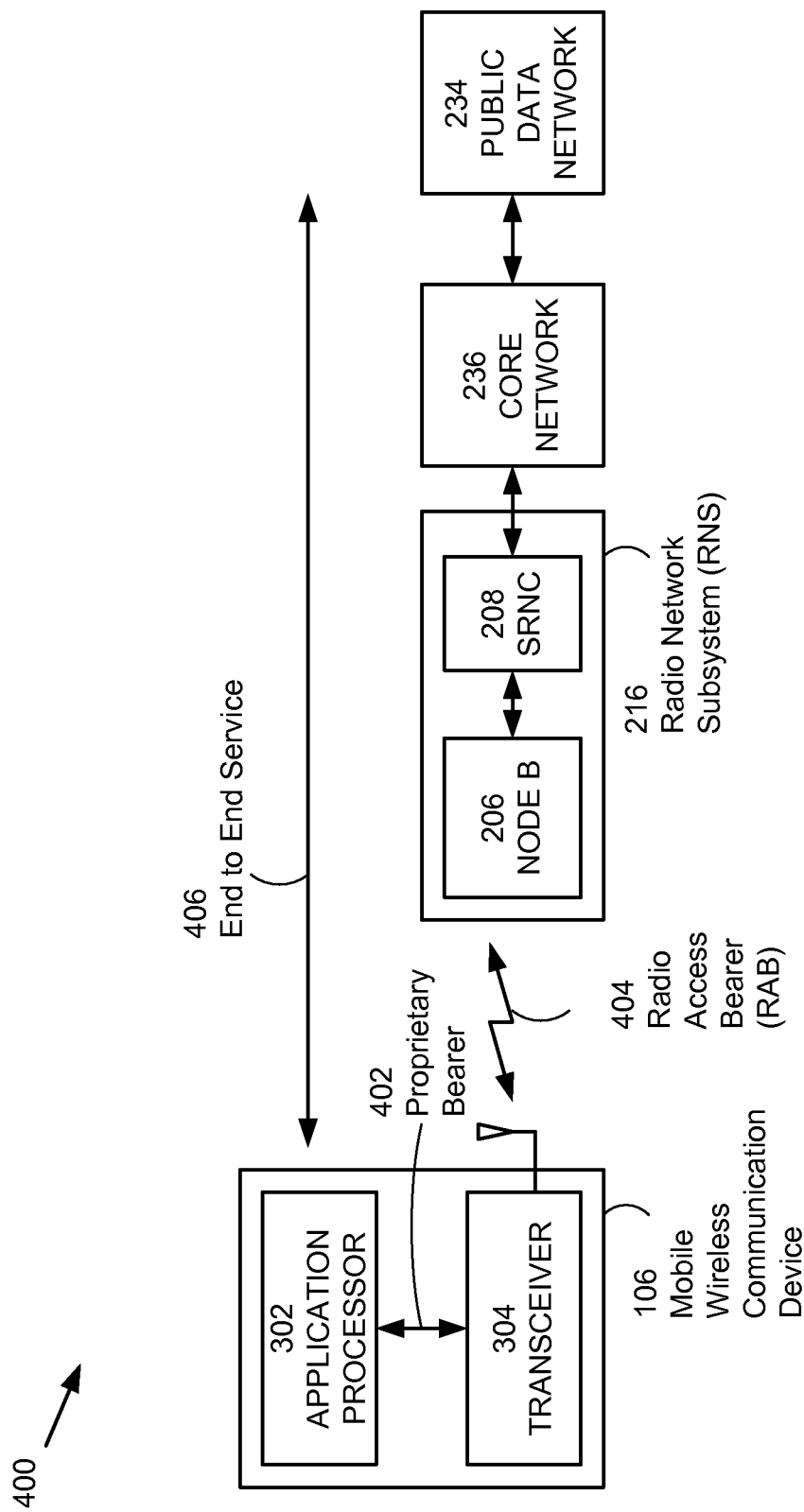
FIG. 4 illustrates connections of the mobile wireless communication device to elements of the wireless communication network.

FIG. 4 illustrates the mobile wireless communication device 106 connected to the public data network 234 to provide an end to end service 406 between the application processor 302 in the mobile wireless communication device 106 and an endpoint (not shown) in (or attached to) the public data network 234. The end to end service 406 can operate at an application level and can use a set of interconnected bearers to transport IP packets between the mobile wireless communication device 106 and the endpoint. Different bearers can be used to connect between individual nodes within the connection. A proprietary bearer 402 can connect between the AP 302 and the XCVR 304 within the mobile wireless communication device 106. Separately, a radio access bearer (RAB) 404 can connect between the mobile wireless communication device 106 and the RNS 216 in the wireless access portion of the wireless communication network. Additional bearer services within the wireless network can exist (although not shown explicitly in FIG. 4). Bearers can exist within the core network 236, and additional bearers can connect a gateway (such as the GGSN 226 in the packet switched domain 240 of the CN 236) to the endpoint in the PDN 234.

Each bearer can have a set of associated bearer service QoS parameters provided to a user of the bearer. UMTS communication protocols describe several traffic classes having different QoS characteristics, including conversational, streaming, interactive and background classes. Conversational and streaming classes can be used to transport delay sensitive packets, while interactive and background classes can support applications with less stringent delay requirements. Each class can also have QoS parameters associated with delay variation (jitter) and packet loss rate among others. An example of an application that can use the conversational traffic class is a voice over IP (VoIP) application. IP packets carrying voice can have low delay requirements and can require that the IP packets be delivered in a strict order. The conversational class can tolerate some voice packet loss. Other applications that can use the conversational traffic class include video telephony and video conferencing, which can carry a multimedia combination of audio, video and data transfer, as well as interactive gaming. Conversational class applications can typically involve two-way data transfer.

A streaming class application can provide a one-way data transfer such as audio and video streaming having less strict delay requirements and limited (if any) interactivity by the user. To achieve an acceptable quality of playback of the streamed audio and video, the packet loss rate can be lower for the streaming class application than for a voice or video telephony application using the conversational class. The delivery order of packets in a streaming class can be preserved for proper playback of the received audio or video stream.

An interactive traffic class can support applications with less delay sensitivity than conversational and streaming classes. Representative applications that can use the interactive traffic class include web browsing and accessing e-mail. With less restrictive delay requirements, an interactive traffic class connection can offer an improved bit error rate (and an improved packet loss rate) by adding error correction and retransmissions. Finally a background traffic class can be used for applications without strict delay requirements. The background class can provide high data integrity, such as used for file transfer protocols.

UMTS bearers can define values or ranges for specific QoS attributes for each traffic class, such as an acceptable packet loss rate, maximum delay latency and requirements for packet delivery order. UMTS bearers, such as the radio access bearer 404 between the mobile wireless communication device 106 and the RNS 216, can simultaneously support traffic from multiple applications in the mobile wireless communication device. The application processor 302 can generate IP packets that include a header that specifies a requested QoS treatment for that IP packet. The QoS mechanisms for the wireless link used by the wireless XCVR 304 in the mobile wireless communication device 106 and QoS mechanisms used by the RNS 216 in the wireless access network can be separate and not well integrated with each other. How to invoke a particular set of QoS properties on the wireless RAB 404 for an application's IP packets that originate at the application processor 302 can be not well defined. To overcome this deficiency, communication about an IP packet's QoS requirements can be transported along with the IP packet through a "proprietary" bearer 402 to the XCVR 304. The XCVR 304 can then map the IP packet to an appropriate RAB 404 having a desired QoS characteristic, such as for a particular traffic class as described above.

Figure 5:
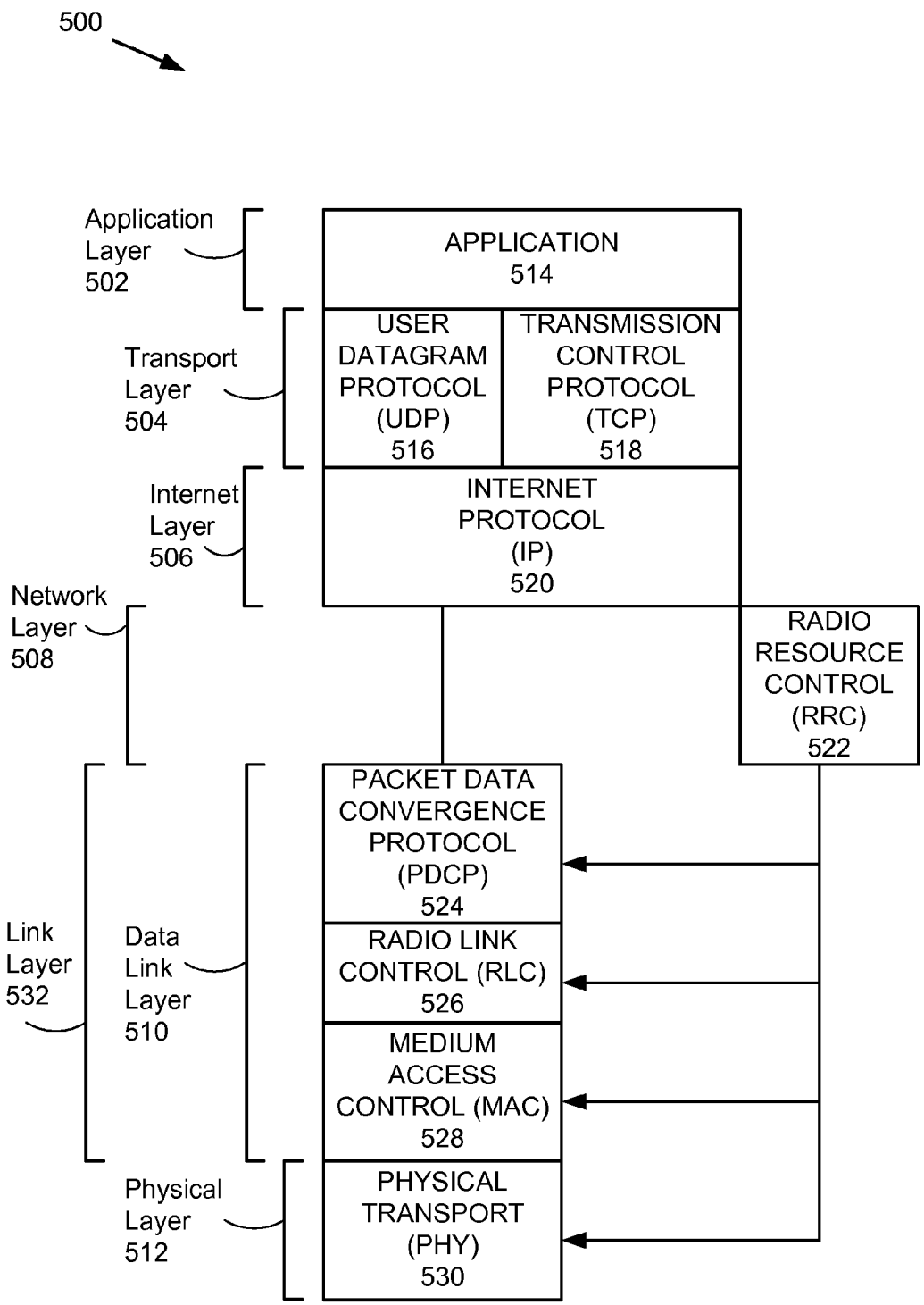
FIG. 5 illustrates a layered communication protocol stack.

FIG. 5 illustrates a hierarchical stack 500 of communication protocols that can be used by the mobile wireless communication device 106 as well as by processing blocks in nodes across the communication link for an end to end service 406. Higher layers in the hierarchical stack 500 can be closer to processing by the application, while layers lower in the stack can be closer to the transmission of data across a physical link. An application 514 in an application layer 502 can generate user data and communicate that data to another peer level application located in a parallel application layer across a communication link. Some well known protocols that can operate at the application layer 502 level include the hypertext transfer protocol (HTTP) such as used for web browsing and the file transfer protocol (FTP) used to copy data between host computers. The application 514 in the application layer 502 can pass the user data down to lower layers in the hierarchical stack 500 for additional formatting and processing in order to communicate the user data across the communication network.

Application level data generated at the application layer 502 can be passed to a transport layer 504 that can transfer the application level data to a peer transport layer 504 at the other end of the communication link. Two common transport layer protocols include the Transmission Control Protocol (TCP) 518 and the User Datagram Protocol (UDP) 516. TCP 518, a connection-oriented protocol, can ensure that application level data arrives in proper order with minimal errors. Duplicate data can be discarded, and lost data can be retransmitted. Thus TCP 518 can be considered to provide reliable data transport. UDP 516, a connectionless protocol, can provide a less reliable link that can be used for applications that can tolerate out of order data, missing data, data received with errors and duplicate data. Applications that can be more sensitive to delay but less sensitive to packet loss, such as VoIP, can prefer to use UDP 516 rather than TCP 518 for data transport. The transport layer 504 can format the received application data into a packet (or datagram) and pass the packet to an internet layer 506.

The internet layer 506 can include an Internet Protocol (IP) 520 to provide transmission of packets between networks, i.e. routing the packets from a source to a destination. The transport layer packet (e.g. a UDP datagram) can be encapsulated into an IP packet that includes an IP header with an IP address that can specify the source and destination for the IP packet. A router can read the IP header to determine to which node to forward the packet in order to reach its destination. The application processor 302 in the mobile wireless communication device 106 can process the application data through the top three layers in the hierarchical stack 500 and then pass an IP packet to the transceiver 304 for further processing into an appropriate form for transmission over the wireless radio access bearer (RAB) 404. The application processor 302 can have control of QoS at the internet layer 506 through setting values in the IP header. The application process 302 can also influence the network layer 508 that can include radio resource control (RRC) 522 through a standard socket interface. For lower layers, the application processor 302 can control QoS through non-standard interfaces.

The transceiver 304 can include processing elements to implement a data link layer 510 (also called a link layer 532) that includes several sub-layers. The data link layer 510 can include a packet data convergence protocol (PDCP) 524 layer, a radio link control (RLC) 526 layer and a medium access control (MAC) 528 layer. The application, transport and internet protocol layers higher in the protocol stack can be independent of any physical hardware networking technology used to actually transmit and receive data over a physical medium. The lower layers can convert the IP packets to a form appropriate for transmission on the physical medium.

The PDCP 524 layer can perform IP header compression and decompression on the IP packet. The RLC 526 layer can segment and reassemble the modified IP packet into a sequence of link layer protocol data units (PDUs). In an acknowledged mode, the RLC 526 layer can ensure all link layer PDUs are received before reassembling the IP packet. The MAC 528 layer can multiplex and de-multiplex the link layer PDUs into transport blocks delivered to transport channels at the physical (PHY) layer 512. Different physical transport protocols 530 at the PHY layer 512 can be used for different physical media, such as different wireless access radio technologies as specified in wireless protocols including GSM, UMTS, CDMA2000 and LTE. A radio resource control (RRC) 522 processing unit at the network layer 508 can provide control of the data link layer 510 and physical layer 512.

Figure 6:
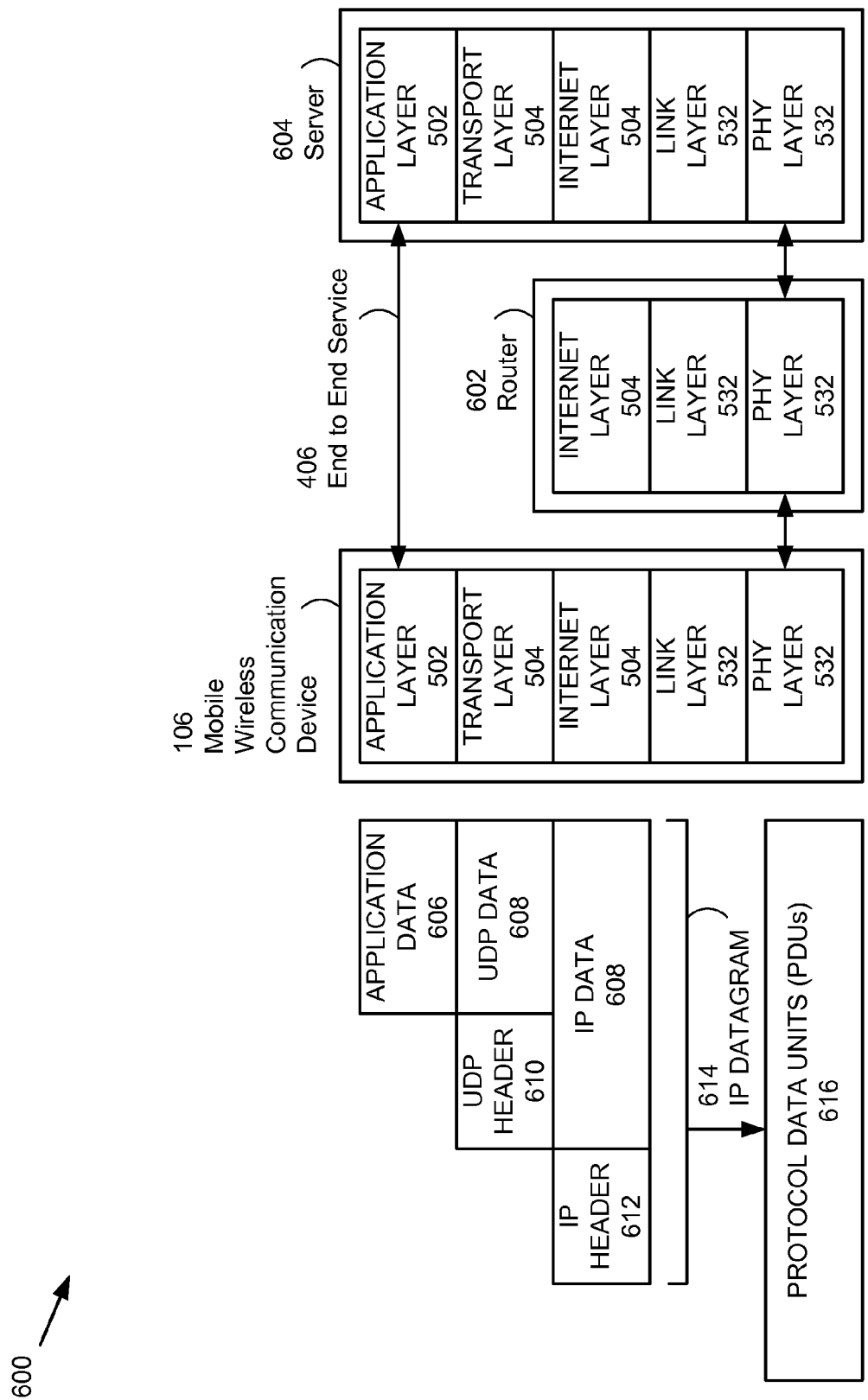
FIG. 6 illustrates packet formats for several layers in the layered communication protocol stack.

As shown in FIG. 6, a block 606 of application data originating at the application layer 502 in the mobile wireless communication device 106 can be encapsulated as UDP data 608. A UDP header 610 can be appended to the UDP data 608 in the transport layer 504 when using the UDP 516 transport layer protocol to form a transport layer packet. The transport layer packet can be passed to the internet layer 504 as an IP data block 608 which can in turn be encapsulated with an IP header 612 to form an IP datagram 614. The IP datagram 614 can be considered a basic unit of data that the application processor 302 delivers to the transceiver 304 in the mobile wireless communication device 106.

The transceiver 304, using a set of link layer 532 protocols can transform the IP datagram 614 into a series of lower layer protocol data units (PDUs) 616 that can be transmitted across a physical layer link. The IP header 612 can include an address for the destination, such as a server 604 to which an application in the mobile wireless communication device 106 can be connected to provide an end to end service 406. Multiple intermediate nodes can exist between the originating mobile wireless communication device 106 and the destination server 604. A router 602 at an intermediate node can forward the IP datagram 614 based on information in the IP header 612.

In addition to a destination address, the IP header 612 can also include a field that specifies QoS parameters for the IP datagram 614. The router 602 can read this field and prioritize the IP datagram 614 accordingly. Not all nodes between the source point (i.e. the mobile wireless communication device 106) and the end point (i.e. the server 614) can read the IP header 612 fields, however, as they can operate using only the lower layer protocols. For example, the transceiver 304 in the mobile wireless communication device 106 can treat the IP header 612 as data only without associating any particular meaning to values in fields of the IP header 612. In such an implementation, there can be a clear separation of higher layer processing in the application processor 302 and lower layer processing in the transceiver 304. A QoS field in the IP header 612, such as an IP TOS field, can be used by the higher layers, such as the IP, routing and transport layers. Matching a desired QoS as specified in the IP header 612 to particular transmission QoS characteristics available at the lower layers can thus be challenging. As described further herein, the lower layer protocols can "snoop" inside the higher layer packet to read at least some of the information contained in headers to determine QoS treatment for the IP datagram 614.

Without reading the IP header 612, the lower layers can require a separate proprietary communication mechanism from the higher layers to ensure that the lower layer QoS matches requirements from the higher layers. A representative implementation of such a mechanism can include separate queues maintained by the lower layer protocol processing block, such as the transceiver 304, and known by the application processor 302. Each queue can be associated with a different communication link or flow and negotiated by the transceiver 304 when establishing the flow with the wireless access network. The application can be aware of the differently configured QoS flows available and can append IP datagrams 614 into each queue destined for each flow. Through a proprietary mechanism, not shown, the application layer can directly request flows having specific QoS characteristics that the lower layer in the transceiver can establish. Reducing the QoS negotiation to a simpler approach can be preferred, such as reusing an embedded QoS header available in the IP datagram 614 as described next.

Figure 7:
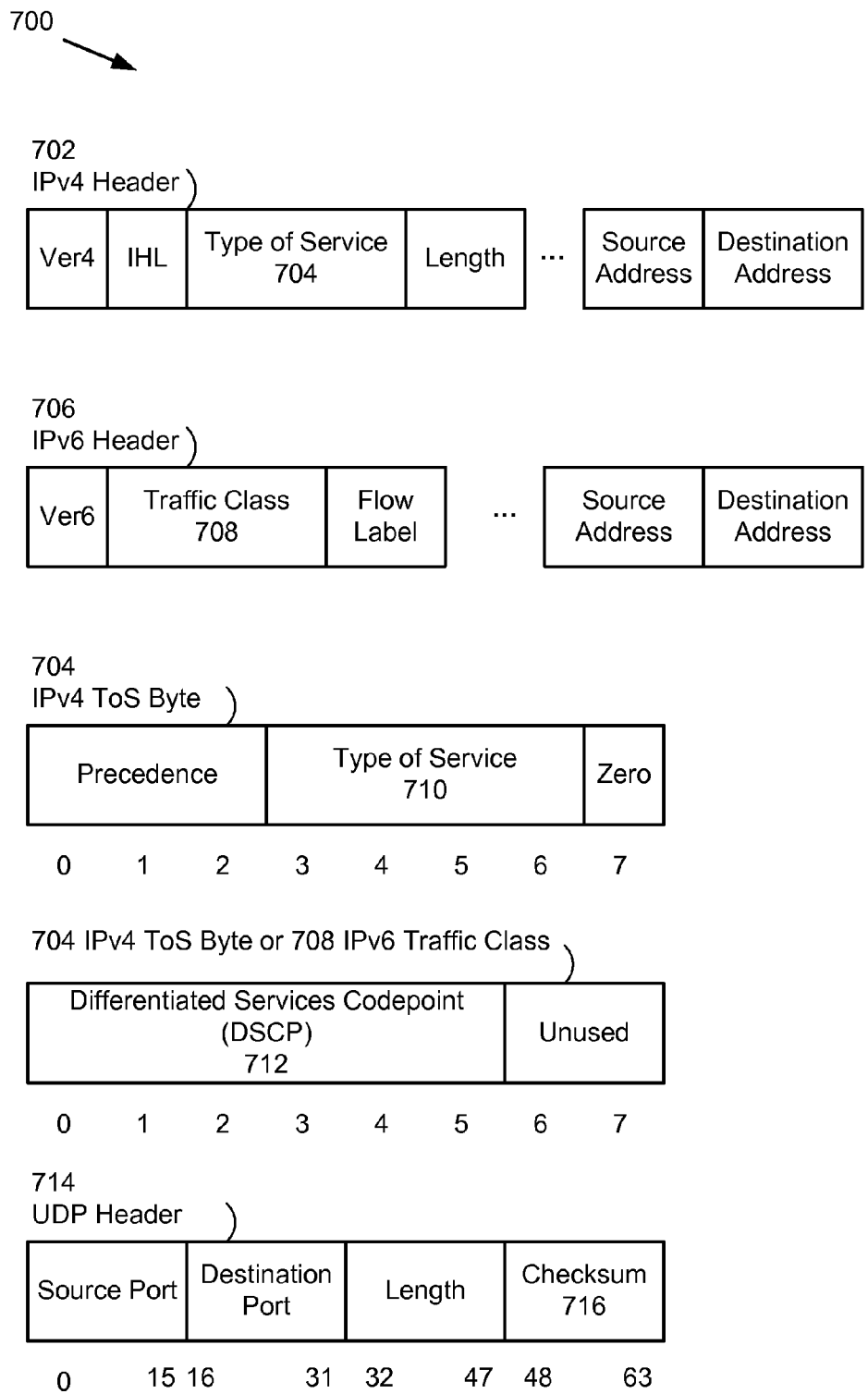
FIG. 7 illustrates representative formats for headers of packets used at the internet layer and transport layer of the layered communication protocol stack.

FIG. 7 illustrates representative formats for the IP header 612 and the UDP header 610 used by the higher layer protocols. For an IP version 4 (IPv4) header 702, a type of service (TOS) byte 704 can be included to specify a quality of service to be applied to the IP datagram 614 as it traverses the internet. The IPv4 TOS byte 704 can be used as a QoS primitive to provide differentiated services at routers, such as the router 602 along the communication link that provides end to end service 406 between the mobile wireless communication device 106 and the server 604 shown in FIG. 6. The IPv4 TOS byte 704 can define a policy and priority to be applied to a packet as it encounters routing elements at each hop across a communication link. For example, the IPv4 TOS byte 704 can define a priority level for the IP datagram 614 using a set of precedence bits and specify for a high or low level of delay, throughput or reliability using a TOS field 710 contained in the IPv4 TOS byte 704. The IPv4 TOS byte 704 can also be defined as a differentiated services field.

For an IP version 6 (IPv6) header 706, a traffic class byte 708 can include a six bit wide differentiated services code point (DSCP) 712 field. The DSCP 712 field can be used similarly to the TOS field 710 in the IPv4 TOS byte 704. The DSCP 712 field can be used to classify IP datagrams 614 to indicate particular QoS characteristics to be applied to the IP datagram 614. A value in the DSCP 712 field can select a "per hop behavior" that an IP datagram 614 experiences at a node in the communication link. Essentially, the DSCP 712 field can divide all IP datagrams 614 into different traffic classes, where each traffic class can experience the same behavior. A representative DSCP 712 field value can specify "expedited forwarding" so that the IP datagram 614 can have QoS characteristics of low delay, low loss and low jitter. Another representative DSCP 712 field value can define "assured forwarding" that guarantees deliver of the IP datagram 614 unless a high level of traffic congestion occurs. A third representative DSCP 712 field value can indicate a "best effort" only forwarding.

In addition to the TOS field 710 (and similarly the DSCP field 712) in the IP header 612, a UDP header 610/714 can include a 16 bit UDP checksum field 716. In some implementations, use of the UDP checksum field 716 can be optional and disabled. In this case, the UDP checksum field 716 can be re-appropriated for a different purpose when transported on the proprietary bearer 402 connection between the application processor 302 and the transceiver 304. In particular, values of the UDP checksum field 716 can be associated with different QoS characteristics to be applied by the transceiver 304 to the IP datagram 614 in which the UDP checksum field 716 is contained. When used for transmitting QoS characteristics, the UDP checksum field 716 in the IP datagram 614 can be set by the application processor 302 before transmitting the IP datagram 614 on the proprietary bearer 402. The UDP checksum field 716 can then be cleared by the transceiver 304 before transmitting the IP datagram 614 on the radio access bearer 404. The UDP checksum field 706 can thus serve as an in-band signaling method to transport QoS characteristics for an IP datagram 614 between the application processor 302 and the transceiver 304. An advantage of using the UDP checksum field 706 to communicate QoS characteristics for the wireless radio access link is that the meaning of the UDP checksum field values can be proprietary to the wireless communication device 106 and can be not exposed as a matter of policy. This can provide the flexibility of an admission control mechanism which applications can use for QoS on the mobile wireless communication device 106.

The IP level TOS field 710, DSCP 712 field and the UDP level checksum field 716 can be used independently or together to provide a flexible method for classifying and prioritizing packet transmission on the radio access bearer 404. The application processor can include values in one or both of the TOS/DSCP field 710/712 and the UDP checksum field 716 to indicate to the transceiver 304 how packets from the IP datagram 614 should be treated when transmitted over the wireless radio access link. The application processor 302 can indicate to the transceiver 304 required QoS characteristics by setting the values in the IP level TOS field 710, DSCP 712 field and/or the UDP level checksum field 716. When using the IP level TOS field 710 or the DSCP 712 field, the application processor 302 can be decoupled from the detailed QoS characteristics at the link layer 532. The application processor 302 need only establish required QoS settings for the internet layer 504, and the transceiver 304 can interpret the values in the IP level TOS field 710 or DSCP 712 field appropriately. A standardized "socket" implementation for communication between the application processor 302 and the transceiver 304 can be used instead of a more complex proprietary mechanism with multiple queues for multiple flows. Signaling for QoS can be "in-band" together with the packets rather than communicated separately using proprietary "out-of-band" channels.

The transceiver 304 can use the values in the TOS/DSCP field 710/712 and/or in the UDP checksum field 716 to classify the IP datagram 614 into one or more traffic classes associated with flows or channels on the wireless radio access link. Each traffic class can have a set of QoS characteristics associated with it. The transceiver 304 can trigger QoS relative logic such as used for setting up and tearing down connections having particular QoS properties. The transceiver 304 can request an allocation of a channel from the wireless access network having one or more QoS properties based on the value used in the TOS/DSCP field 710/712. The transceiver 304 can also monitor IP datagrams 614 received from the application processor 302 and release a connection after a pre-determined timeout period when no IP datagrams 614 are received having the same value in the TOS/DSCP field 710/712 as when establishing the connection. Thus the application processor 302 can use the TOS/DSCP field 710/712 values as an indirect means to communication QoS requests and to establish and release communication links supporting required QoS for an application. The transceiver 304 can also use the values to prioritize the IP datagrams 614, assigning the IP datagrams 614 to different channels or flows in order to affect latency or delivery guarantees. Prioritization can also occur between IP datagrams 614 assigned to the same traffic class, such as placing one IP datagram 614 before another IP datagram 614 in the same queue servicing a particular channel or flow.

Figure 8:
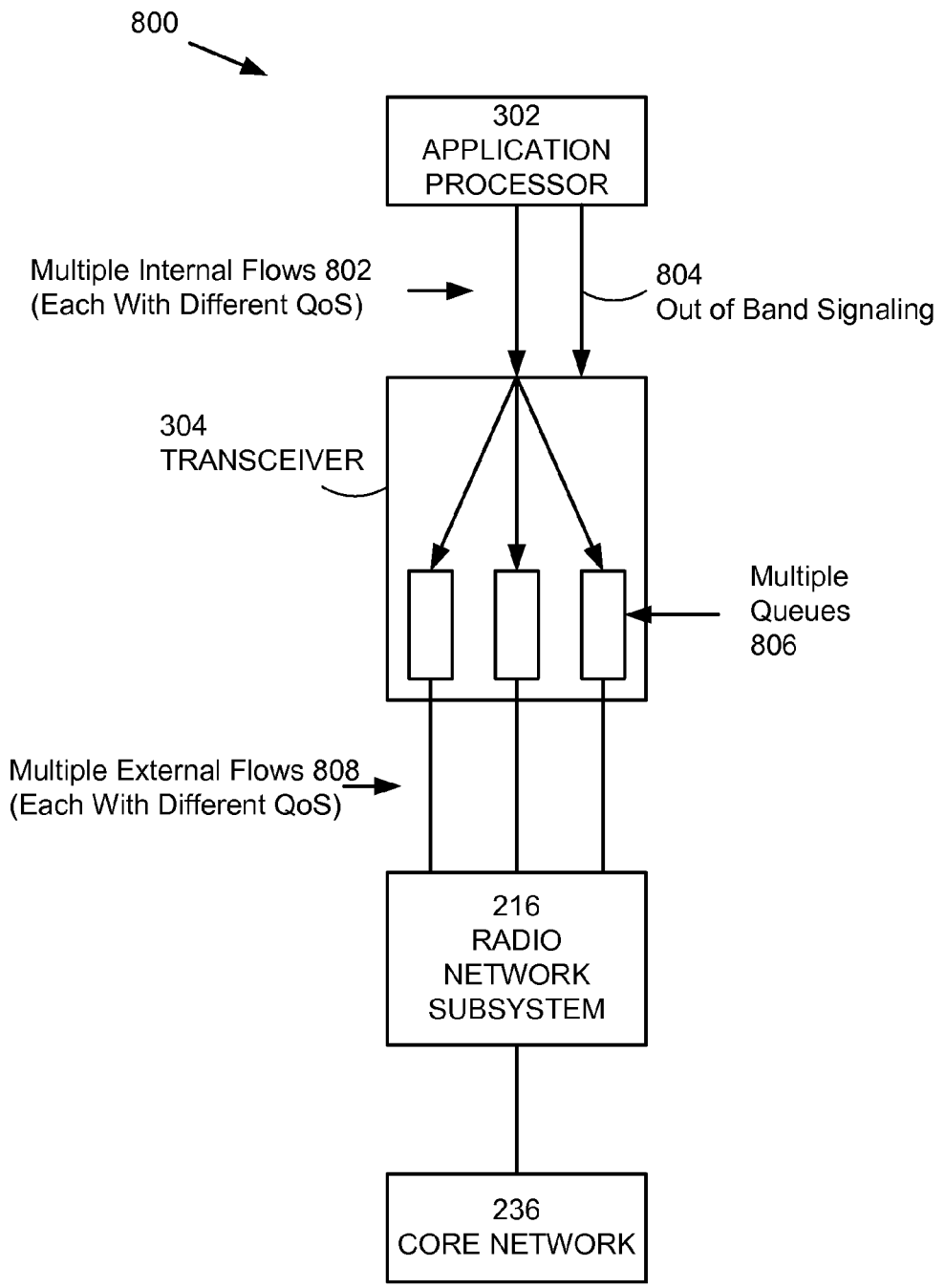
FIG. 8 illustrates an out of band signaling structure for differentiated treatment of data packets.

FIG. 8 illustrates a structure 800 with multiple flows 802 between the application processor 302 and the transceiver 304 using a proprietary out of band signaling 804 to differentiate treatment for different IP datagrams 614 contained in the multiple flows 802. The transceiver 304 can establish multiple external flows 808, each having different QoS properties, to the radio network subsystem 216. The transceiver can use information in the out of band signaling path 804 to determine into which queue to place an IP datagram 614 (or packet created from the IP datagram 614). The transceiver 304 can maintain multiple queues 806, each queue associated with one of the flows, and packets formed from the IP datagrams 614 can be placed in a queue associated with a flow having QoS characteristics that match.

The out of band signaling 804 path can provide a mechanism by which application packets can be mapped to particular logical channels on the wireless radio access bearer. Out of band signaling 804 can be accomplished by adding tags to each IP datagram 614 that specify QoS treatment for the IP datagram 614. The application processor 302 and the transceiver 304 can also establish flows between them based on commands from the application processor 302 when establishing a connection for an application. All IP datagrams 614 associated with a particular application can be then mapped to a particular logical channel flow on the radio air interface that can have certain QoS properties. Disadvantageously out of band signaling can add overhead and complexity to the communication between the application processor 302 and the transceiver 304.

Figure 9:
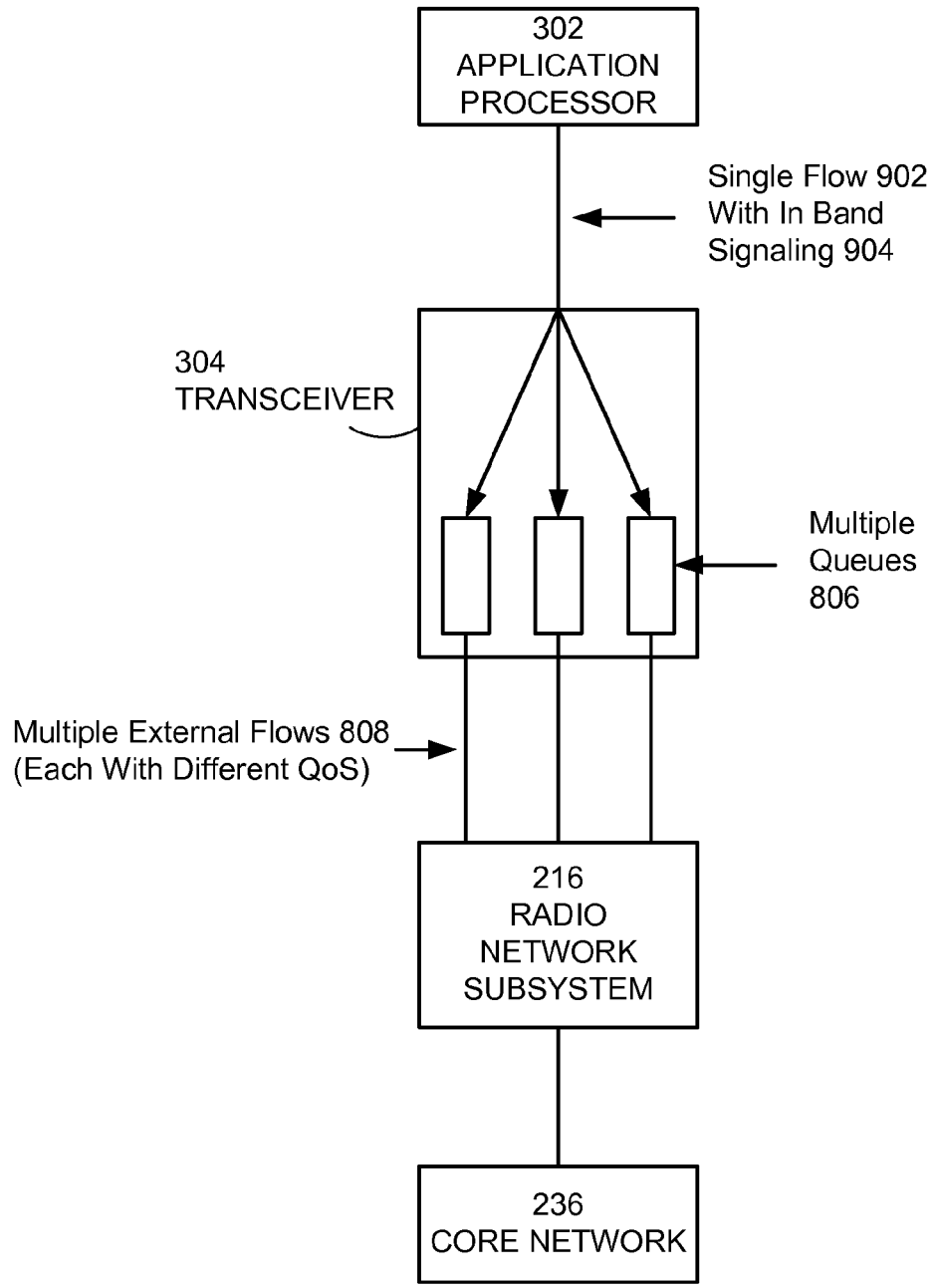
FIG. 9 illustrates an in band signaling structure for differentiated treatment of data packets.

FIG. 9 illustrates a structure 900 having a single flow 902 that can use in band signaling 904 between the application processor 302 and the transceiver 304. Individual packets, such as IP datagrams 614, can include QoS indications using the embedded TOS field 710 (or DSCP 712 field) and the UDP level checksum field 716. In band signaling 904 can reduce overhead and provide more streamlined packet level processing in the application processor 302 and transceiver 304. Advantageously, no change to the structural format of an IP datagram 614 can be required, as fields that already exist for QoS (such as the TOS/DSCP fields 710/712) or fields that can be used locally for QoS purposes such as the UDP level checksum field 716 can already exist in the IP datagram 614 format. The transceiver 304 can "snoop" inside a received IP datagram 614 reading one or more of the higher layer fields, such as the TOS/DSCP fields 710/712 or the UDP checksum field 716. The transceiver 304 can determine a QoS for the IP datagram 614 based on values contained in the fields. Reusing existing QoS information already stored in the IP datagram 614 can be more efficient than generating a separate out of band signaling tag for each IP datagram 614.

The QoS policy treatment applied at the lower layers in the transceiver 304 can differ from the QoS specified by the higher layers in the TOS/DSCP fields 710/712. A mapping of IP datagrams 614 having TOS/DSCP fields 710/712 with particular values to a particular flow on the radio access portion of the communication link can not necessarily guarantee certain QoS characteristics as expected for routers for example. A mapping by the transceiver 304 can appropriately match an IP datagram 614 to a flow without necessarily guaranteeing a particular latency or other higher layer QoS characteristic. The mapping can, however, match the IP datagram 614 as best as possible to different external flows 808 available with varying QoS properties. The transceiver 304 can also establish and release external flows 808 dynamically to support IP datagrams 614 received from the applications processor 302. New IP datagrams 614 can have changing QoS characteristics from those previously transmitted, and available external flows 808 can be changed accordingly. Properties of the external flows 808 that can be determined by values in the TOS/DSCP fields 710/712 or the UDP checksum field 716 can include internal parameters such as queue sizes and timer values. Other properties that can be affected by the values include bandwidth allocation, latency, PDU size and re-transmission preferences.

The mapping of the IP datagram 614 based on a QoS parameter specified in the IP datagram 614 to a flow with a QoS characteristic on which the IP datagram 614 can be transmitted can also depend upon a wireless access technology protocol used by the flow on the radio access portion of the wireless communication network. Different wireless access technology protocols, such as UMTS, CDMA2000 and LTE can provide different QoS characteristics for the radio access portion of a connection. A value of a field in the IP datagram used to specify a QoS characteristic can have one meaning and mapping in a UMTS network and a different meaning and mapping in a CDMA2000 network.

In a CDMA2000 network implementation, for example, a IP TOS field value that specifies low delay, low throughput and low reliability, such as used by an interactive voice application, can map to a QoS profile ID of 0x100 in the CDMA2000 network that can be used for low bit rate interactive audio. When the link layer reads the IP TOS field value, the transceiver 304 can request a connection with this QoS profile ID from the wireless access network. The wireless access network can establish a connection (or modify an existing connection) to have appropriate link layer QoS properties accordingly. For a low bit rate interactive audio connection associated with a QoS profile ID of 0x100, the wireless access network can configure the connection to have a number of characteristics. The characteristics can include one or more of a low radio link protocol (RLP) abort timer value, disabling RLP retransmissions based on physical negative acknowledgement (NACK), disabling RLP retransmissions altogether, disregarding "stale" packets waiting in queues for the RLP layer to send. These are a few representative parameters that can be configured by the network when negotiating a connection having particular QoS characteristics at the RLP (link) layer. Similar sets of parameters can be set in a UMTS based network or in another network based on a different wireless access technology.

Parameters that are internal to the mobile wireless communication device 106, such as the transceiver 304, can also be indirectly influenced by values in the IP TOS field 710, DSCP field 712 and/or the UDP checksum field 716. For example, buffers of particular sizes can be established based on the field value to accommodate a particular latency, data rate or other QoS characteristic. Flow control mechanisms such as watermark values can also be chosen based on the field values. Priority mechanisms that can balance internal prioritization of buffers within the transceiver can also be impacted by the field values. Any internal mechanisms that can influence QoS characteristics of packets, whether directly or indirectly, can be changed based on received field values.

Figure 10:
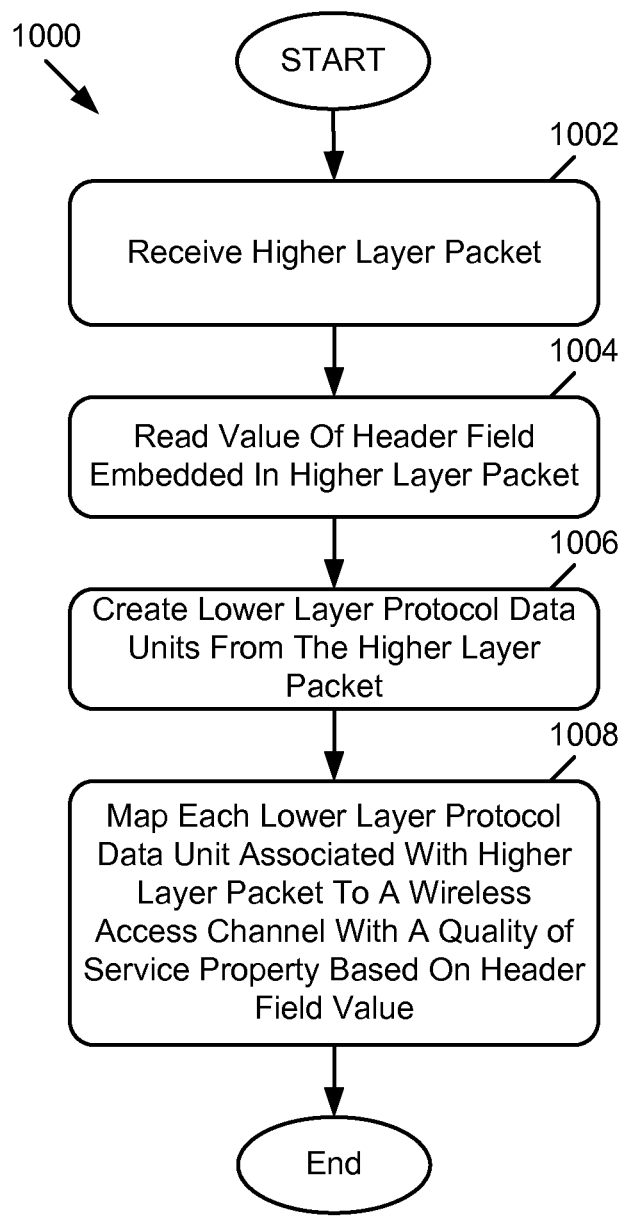
FIG. 10 illustrates a method to classify and prioritize packets in a mobile wireless communication device.

FIG. 10 illustrates a method 1000 for in band QoS treatment of a higher layer packet in the mobile wireless communication device 106. A lower layer processing block in the mobile wireless communication device 106 can receive the higher layer packet in step 1002 from a higher layer processing block. The lower layer processing block can read a value of a header field embedded in the higher layer packet in step 1004. The lower layer processing block can create one or more lower layer protocol data units from the higher layer packet in step 1006. In step 1008, each of the lower layer protocol data units created from the higher layer packet can be mapped to a wireless access channel having a quality of service property based on the read header field value.

In a representative embodiment, the higher layer processing block in the mobile wireless communication device 106 can generate the higher layer packet and embed the header field values. In some embodiments, the higher layer processing block can generate the higher layer packets for applications that require particular QoS treatment when routing the higher layer packet through a communication link. The header field values can reflect the required QoS treatment. The lower layer processing block can match the QoS treatment for the higher layer packet to appropriate logical channels (or flows) having particular properties on the wireless access channel.

Figure 11:
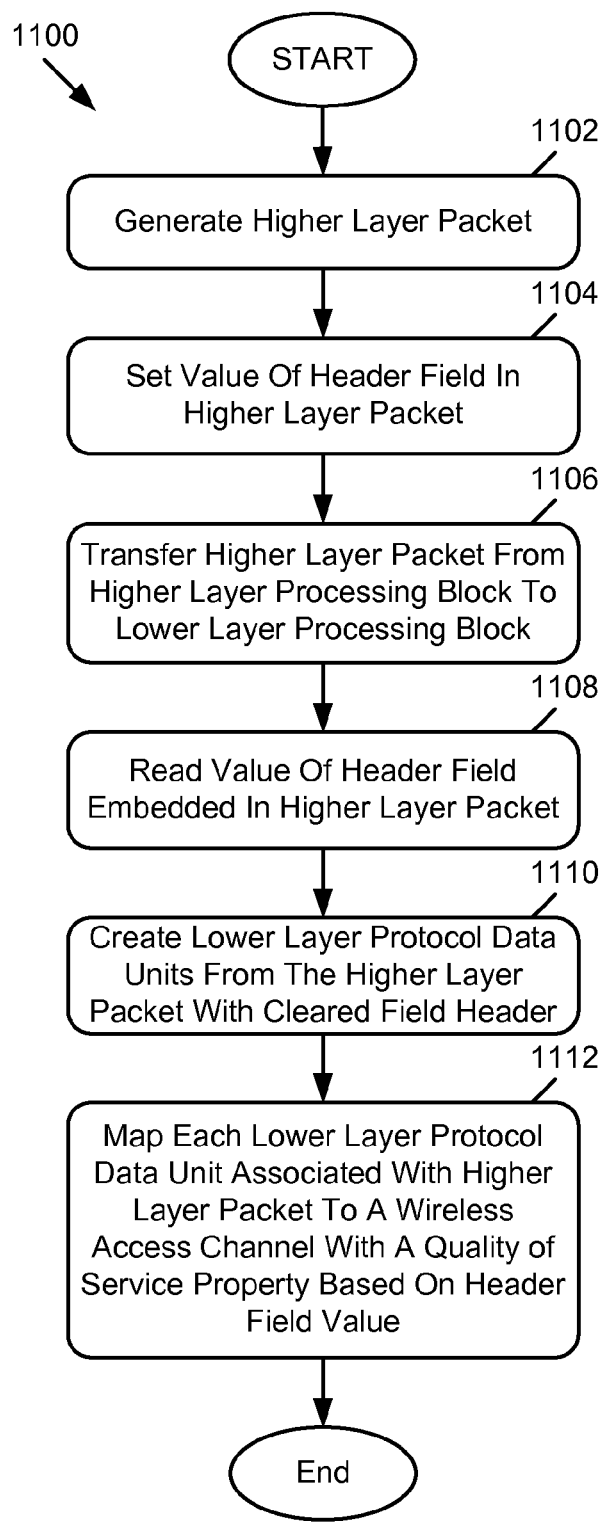
FIG. 11 illustrates another method to classify and prioritize packets in a mobile wireless communication device.

In another embodiment, the application can specify no specific QoS properties for the higher layer packet. As shown in FIG. 11, the higher layer processing block can generate the higher layer packet in step 1102. In step 1104, the higher layer processing block can set a value in an unused field header to affect classification and prioritization of lower layer protocol data units derived from the higher layer packet when mapping the lower layer protocol data units to the wireless access channel. The higher layer processing block can transfer the higher layer packet to the lower layer processing block in step 1106. The lower layer processing block can read the value of the header field embedded in the higher layer packet in step

1108. In step 1110, the lower layer processing block can clear the value in the field header and create lower layer protocol data units derived from the higher layer packet with the cleared field header. In step 1112, the lower layer processing block can map each lower layer protocol data unit associated with the higher layer packet to a wireless channel with a quality of service property based on the read (and then cleared) header field value.

Figure 12:
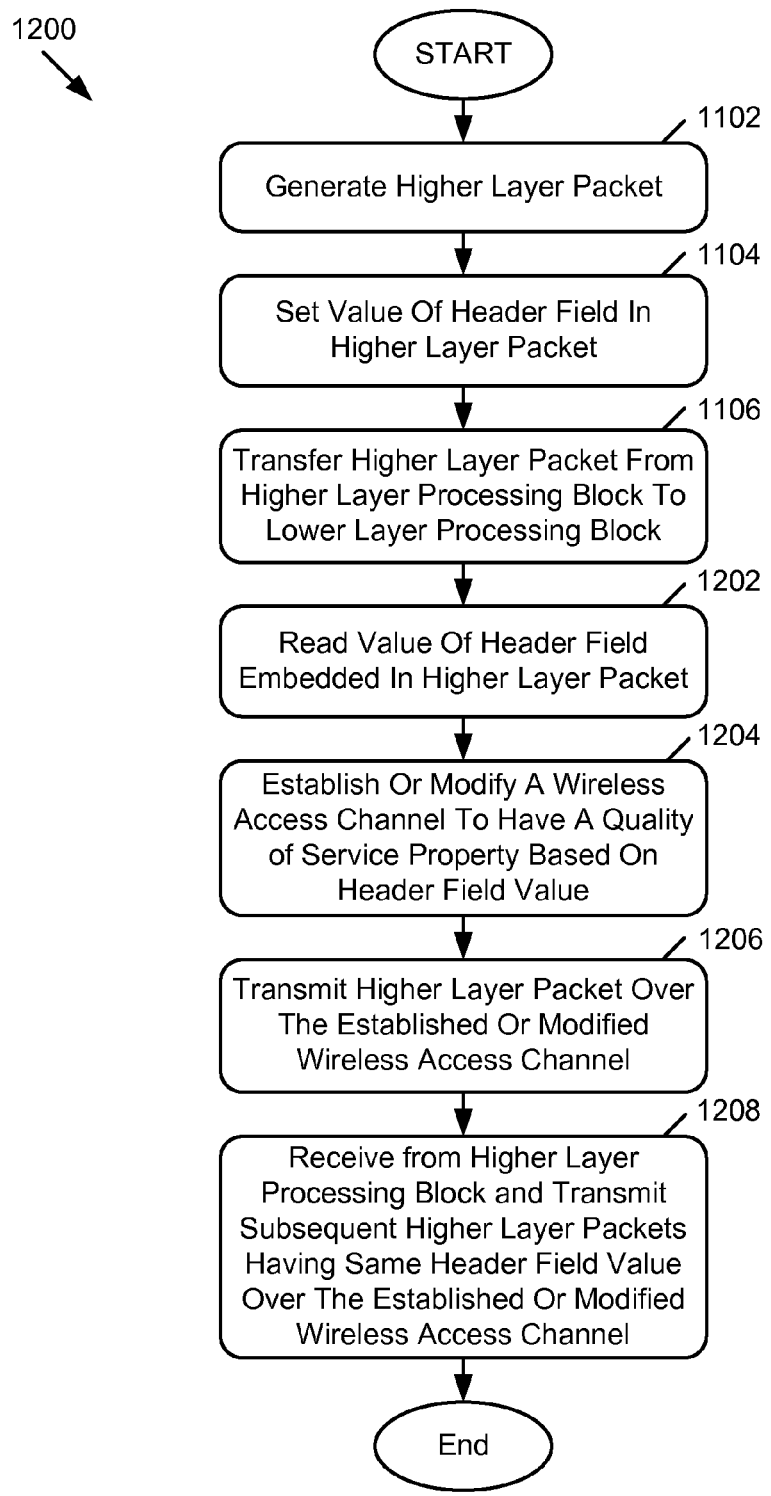
FIG. 12 illustrates a method match higher layer and lower layer QoS through in-band signaling.

In yet another embodiment 1200, a lower layer processing block can establish or modify a wireless access channel to have one or more QoS properties based on receiving a higher layer packet having a header field populated with a particular value. As shown in FIG. 11 and repeated in FIG. 12, the higher layer processing block can generate a higher layer packet in step 1102 and can set a value of a header field contained in the higher layer packet in step 1104. The header field value can specify a set of QoS properties pertaining to the higher layer packet that can be used at the internet, routing and/or network layer in a communication link. The higher layer processing block can transfer the higher layer packet to a lower layer processing block in step 1106. The lower layer processing block can read the value of the header field in step 1202 embedded in the higher layer packet. The lower layer processing block can interpret the header field to require certain QoS properties for a wireless access channel. In step 1204, the lower layer processing block can request from the network a new wireless access channel that has one or more QoS properties based on the header field value. The lower layer processing block can also request that the network modify QoS properties of an existing wireless access channel based on the header field value. The lower layer processing block can transmit the higher layer packet as a series of lower layer packets over the established or modified wireless access channel in step 1206. In step 1208, the lower layer processing block can receive from the higher layer processing block subsequent higher layer packets having the same header field value and transmit them over the established or modified wireless access channel.

Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line used to fabricate thermoplastic molded parts. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for packet classification in a mobile wireless device, the method comprising:
   setting by an application processor a value in a field of a higher layer packet, wherein the packet is a user datagram protocol packet, and the field is a checksum field in a header of the user datagram protocol packet;
   transferring the higher layer packet to a transceiver coupled to the application processor, wherein the application processor and the transceiver are integrated within the mobile wireless device;
   reading by the transceiver the value of the field embedded in the higher layer packet;
   clearing by the transceiver the value in the field of the higher layer packet set by the application processor;
   creating by the transceiver a lower layer protocol data unit from the higher layer packet; and
   mapping by the transceiver the lower layer protocol data unit to a wireless access channel having a transmission property based on the read value of the field, wherein the wireless access channel is one of a plurality of wireless access channels, each being associated with a different quality of service (QoS) configuration.

2. The method as recited in claim 1, wherein the mapping depends upon a wireless access technology used for the wireless access channel.

3. The method as recited in claim 1, further comprising negotiating by the mobile wireless device with a wireless access network to establish or to modify the wireless access channel such that the wireless access channel has the transmission property after reading the value of the field embedded in the higher layer packet.

4. The method as recited in claim 3, wherein the negotiating by the mobile wireless device includes requesting a link layer quality of service characteristic for the wireless access channel from the wireless access network and configuring, by the wireless access network, a radio link protocol layer of the wireless access channel based on the requested link layer quality of service characteristic.

5. The method as recited in claim 1, further comprising configuring by the mobile wireless device flow control and prioritization mechanisms for packets within the mobile wireless device based on the value of the field read by the mobile wireless device.

6. A wireless apparatus including
   an application processor configured for
      generating a higher layer packet,
      setting a value of a header field in the higher layer packet, wherein the higher layer packet is a user datagram protocol packet, and the header field is a checksum field in a header of the user datagram protocol packet, and
      transferring the higher layer packet to a transceiver; and
   the transceiver configured for
      receiving the higher layer packet from the application processor,
      reading the value of the header field in the higher layer packet,
      clearing the value of the header field in the higher layer packet,
      creating at least one lower layer protocol data unit from the higher layer packet, and mapping the lower layer protocol data unit to a wireless access channel having a link layer transmission property based on the header field value read by the transceiver, wherein the wireless access channel is one of a plurality of wireless channels, each associated with a different quality of service (QoS) configuration, and wherein the application processor and the transceiver are physically integrated within the wires apparatus.

7. The wireless apparatus as recited in claim 6, wherein the transceiver is further configured to negotiate with a wireless access network to establish or modify the wireless access channel such that the wireless access channel has the link layer transmission property after reading the value of the header field embedded in the higher layer packet.

8. The wireless apparatus as recited in claim 6, wherein the application processor and the transceiver are contained in a mobile computing device.

9. The wireless apparatus as recited in claim 6, wherein the application processor is contained in a mobile computing device and the transceiver is contained in a separate wireless access device.

10. The wireless apparatus as recited in claim 9, wherein the mobile computing device and the wireless access device are connected by a serial communication link.

11. A non-transitory computer readable medium storing instructions, which when executed by a processor, cause the processor to perform a method for packet classification in a mobile device having an application processor and a transceiver integrated therein, the method comprising:

forming by the application processor a packet containing a segment specifying a quality of service property for the packet, the segment comprising a header field of a higher layer packet, wherein the packet is a user datagram protocol packet, and the field is a checksum field in a header of the user datagram protocol packet;

reading by the transceiver a value of the segment;
clearing by the transceiver the value of the segment;
creating by the transceiver at least one protocol data unit from the packet;
establishing by the transceiver a wireless access channel having one or more transmission properties based on the value of the segment; and
mapping by the transceiver the at least one protocol data unit to the established wireless access channel.

12. The medium as recited in claim 11, wherein establishing the wireless access channel includes setting a prioritization property for transmissions through the wireless access channel.

13. The medium as recited in claim 11, wherein the method further comprises negotiating by the mobile device with a wireless access network to establish or to modify the wireless access channel such that the wireless access channel has the one or more transmission properties after reading the value of the segment of the packet.

14. The medium as recited in claim 11, wherein the established wireless access channel connects a wireless transceiver in the mobile device to a radio network subsystem in a wireless communication network.

15. The medium as recited in claim 11, wherein the method further comprises configuring operational parameters of internal buffers that affect link layer performance used by a wireless transceiver internal to or attached to the mobile device based on the value of the segment of the packet.

16. The medium as recited in claim 11, wherein the method further comprises configuring link layer flow control mechanisms used by a wireless transceiver in the mobile device based on the value of the segment of the packet.

* * * * *